Jan. 20, 1925.　　　　　　　　　　　　　　　　　　　　　　1,523,539
E. J. HAYES
WOODEN VACUUM TUB FOR ICE CREAM AND MILK PRODUCTS
Filed Nov. 30, 1923
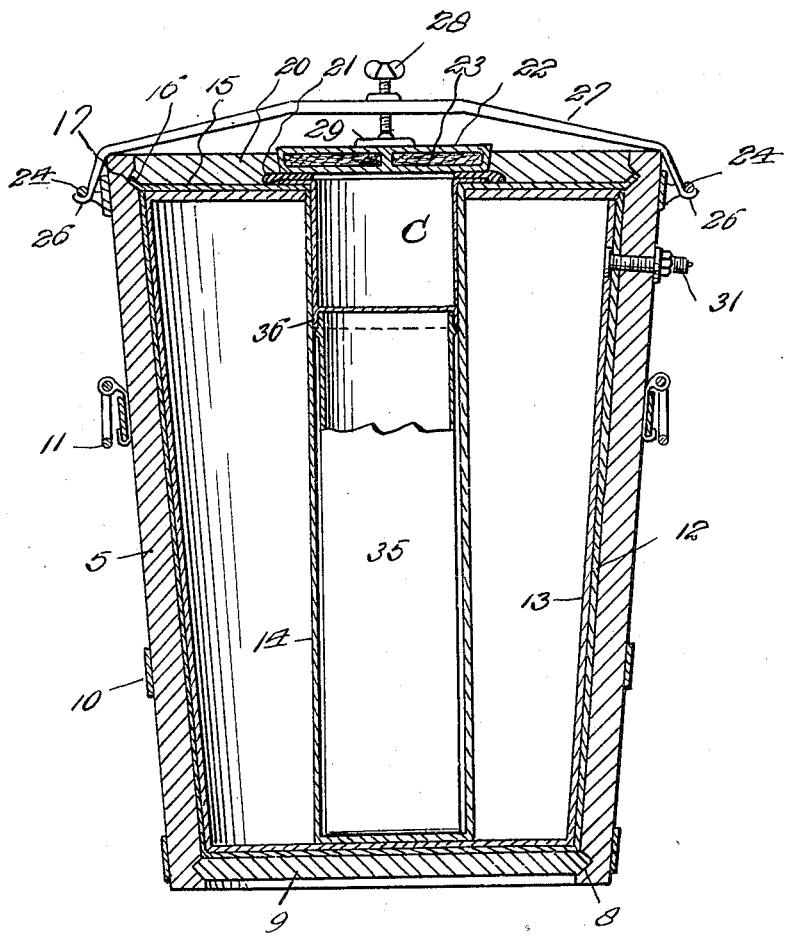
Witnesses:
E. J. Hayes,
Inventor
By [signature]
Attorney Patented Jan. 20, 1925.

1,523,539

UNITED STATES PATENT OFFICE.

EDWARD J. HAYES, OF BEAUMONT, TEXAS.

WOODEN VACUUM TUB FOR ICE CREAM AND MILK PRODUCTS.

Application filed November 30, 1923. Serial No. 677,769.

*To all whom it may concern:*

Be it known that I, EDWARD J. HAYES, citizen of the United States, residing at Beaumont, in the county of Jefferson and State of Texas, have invented certain new and useful Improvements in Wooden Vacuum Tubs for Ice Cream and Milk Products, of which the following is a specification.

My invention relates to improvements in wooden vacuum tubs for ice cream and milk products primarily adapted for the reception of the containers of ice cream and milk products and wherein the frozen ice cream or cold milk products will be maintained in this state for an extended period of time, without the usual necessity of packing ice within the tub around the ice cream container as is now the case.

The invention resides in the hereinafter described novel provision of an ice receptacle above and forming a closure for the ice cream container of a vacuum tub such as described and claimed in my copending application upon vacuum tubs, Serial No. 609,207, filed Dec. 27, 1922.

The nature and advantages of the invention will be better understood with the following detailed description in connection with the accompanying drawing, the invention residing in the construction, combination and arrangement of parts as claimed.

In the drawing, the view is one partly in side elevation, and partly in central vertical section, of my improved device.

Having particular reference to the drawings, my tub consists of a wooden container 5 composed of vertically disposed staves interlocked with each other thru the instrumentality of the usual rim and groove connections. Adjacent the lower end of the tub 5 is an internal annular groove 8 for receiving the bevelled edge of the bottom plate 9. The staves are maintained in close contact with each other, by means of the usual metallic hooks 10, and one of these hooks adjacent the upper end of the tub is formed at diametrically opposite sides with handles 11. The interior of the tub 5 has a lining 12 of paraffin or similar substance, while over this lining of paraffin is a lining 13 of compressed cork.

Centrally within the tub 5 there is positioned a tubular casing 14 open at its upper ends as shown, and being provided adjacent its upper end with a relatively large annular disk or flange 15, the marginal edge of which is bent or flared upwardly as at 16, for engaging the lower wall of the groove 17 that is formed internally of and at the upper end of the wooden tub 5. Upon the bottom surface of the disk or flange 15 is a coating of paraffin and a lining of cork joined to the upper edges of the linings 12 and 13.

There is provided a wooden cover plate 20, the edge of which is formed with a V-rim for engaging within said V-groove 17. When this cover plate 20 is wedged within the upper end of the tub, the flared marginal edge 16 of the disc 15 will be firmly retained within said groove of the tub. The cover 20 is provided with a relatively large central opening and the under surface of this opening is journalled for receiving a rubber gasket 21. Engaging within the opening of the cover plate is a hollow metallic cover 22 for the outwardly flanged upper end of the ice cream container C. The hollow cover plate 22 has a filling of granulated cork or appropriate material 23 therein, and adapted for engagement within integrally formed loop members 24 upon opposite sides of the upper hook 10 are the opposite hooked ends 26 of a cross rod 27. This cross rod 27 is provided with a central screw or bolt, the lower end of which has a head 29 for contact with the cover plate 23, whereby the latter may be forced downwardly to secure the same and the gasket 21 on the upper end of the flange of the ice container C.

Extending through an opening in the side wall of the tub, and also through the linings 12 and 13 is an air outlet nipple 31 having any desired form of check valve therein, and it will be apparent that when the tub is constructed as shown, and an exhaust pump connected to the air outlet nipple 31, the vacuum may be produced between the wall of the tub 5 and the ice cream container 14. The ice cream can 35 is shorter than the container 14 and is closed at its top by the ice container C, the latter having the flange 36 depending from its bottom and forming with the latter a cap for said ice cream can.

In this manner, the ice container C is supported in the upper end of the container 14 with its flange resting upon the disc or flange 15 beneath the gasket 21. By the provision of the receptacle C, the contents of the can 35 are effectively protected at the top of the latter and maintained in a closed state for a longer period. At the same time, the ice within the container C may be replenished from time to time, and as the flange on the upper end of the container C is of a smaller diameter than the opening in the cover 20, said container C may be removed when it is desired to have access to the contents of the can 35.

Having thus described my invention, what I claim as new and desire to secure by Letters Patent is:

1. In an article of the class described, the combination of a wooden container, a metallic container disposed centrally therein, a rigid cover for the wooden container, a detachable cover for the metallic container, a can within the metallic container, an ice receptacle covering the can and arranged within the upper end of the metallic container, said ice receptacle having an opened upper end closed by said detachable cover, said detachable cover engaging through an opening within the rigid cover, and means for establishing a vacuum between the wooden container and the metallic container.

2. In an article of the class described, the combination of a wooden container, a metallic container disposed centrally therein, a rigid cover for the wooden container, a detachable cover for the metallic container, a can within the metallic container, an ice receptacle covering the can and arranged within the upper end of the metallic container, said ice receptacle having an opened upper end closed by said detachable cover, said detachable cover engaging through an opening within the rigid cover, means for establishing a vacuum between the wooden container and the metallic container, said metallic container having an outwardly directed relatively large flange covering the top of the wooden container between the latter and the metallic container, said ice receptacle having an annular flange of lesser diameter than the opening in the rigid cover and resting upon the flange of a metallic container.

In testimony whereof I affix my signature.

EDWARD J. HAYES.